(12) United States Patent
Gerakoulis

(10) Patent No.: US 7,936,730 B2
(45) Date of Patent: May 3, 2011

(54) CDMA TO PACKET-SWITCHING INTERFACE FOR CODE DIVISION SWITCHING IN A TERRESTRIAL WIRELESS SYSTEM

(75) Inventor: Diakoumis Parissis Gerakoulis, Dover, NJ (US)

(73) Assignee: AT&T Intellectual Property II, L.P.

( * ) Notice: Subject to any disclaimer, the term of this patent is extended or adjusted under 35 U.S.C. 154(b) by 826 days.

(21) Appl. No.: 11/906,910

(22) Filed: Oct. 4, 2007

(65) Prior Publication Data
US 2008/0219220 A1    Sep. 11, 2008

Related U.S. Application Data

(63) Continuation of application No. 11/051,378, filed on Feb. 4, 2005, now Pat. No. 7,349,375, which is a continuation of application No. 09/770,858, filed on Jan. 26, 2001, now Pat. No. 6,912,211.

(51) Int. Cl.
*H04B 7/216*    (2006.01)
(52) U.S. Cl. .......................... 370/335; 370/342; 370/441
(58) Field of Classification Search .................. 370/335, 370/342, 441
See application file for complete search history.

(56) References Cited

U.S. PATENT DOCUMENTS

| | | | |
|---|---|---|---|
| 5,481,544 A | 1/1996 | Baldwin et al. | 370/392 |
| 5,577,025 A | 11/1996 | Skinner et al. | |
| 5,805,579 A | 9/1998 | Erving et al. | |
| 5,815,527 A | 9/1998 | Erving et al. | |
| 5,838,669 A | 11/1998 | Gerakoulis | 370/320 |
| 5,995,497 A | 11/1999 | Gerakoulis | |
| 6,185,197 B1 | 2/2001 | Cheung Yeung et al. | |
| 6,389,034 B1 | 5/2002 | Guo et al. | |
| 6,665,825 B1 | 12/2003 | Mobin et al. | |
| 6,782,035 B1 | 8/2004 | Nakamura et al. | 375/130 |
| 6,912,211 B2 | 6/2005 | Gerakoulis | |
| 6,963,540 B2 | 11/2005 | Choi et al. | |
| 2001/0018347 A1 | 8/2001 | Ziv et al. | |
| 2002/0110102 A1 | 8/2002 | Wei et al. | |
| 2004/0101032 A1 | 5/2004 | Dabak et al. | 375/143 |

*Primary Examiner* — Andrew Lee

(57) ABSTRACT

An access radio port is provided that includes means for spreading a payload data signal, extracted from an ATM packet, with a uniquely assigned orthogonal code, means for transmitting the spread payload data signal to one of a group of mobile subscriber terminals located within a microport cell of a wireless terrestrial network, and means for releasing the uniquely assigned orthogonal code. In another aspect, a mobile subscriber terminal, configured to be located within a microport cell of a terrestrial wireless network that interfaces with an access radio port, is provided. The mobile subscriber terminal includes means for receiving an assignment of a unique orthogonal code, means for spreading a payload data signal by the unique orthogonal code, means for modulating and forwarding the spread payload data signal to the access radio port, and means for releasing the assignment of the unique orthogonal code.

6 Claims, 15 Drawing Sheets

CDMA TO PACKET-SWITCHING INTERFACE FOR CODE DIVISION SWITCHING IN A TERRESTRIAL WIRELESS SYSTEM

This application is a continuation of U.S. patent application Ser. No. 11/051,378 files Feb. 4, 2005 now U.S. Pat. No. 7,349,375, which is a continuation of U.S. patent application Ser. No. 09/770,858, filed on Jan. 26, 2001 now U.S. Pat. No. 6,912,211, which is related to U.S. patent application Ser. No. 09/770,890, filed on Jan. 26, 2001.

FIELD OF THE INVENTION

The invention relates generally to communications systems and in particularly, to wireless systems using a wireline backbone to communicate between a source subscriber terminal and a destination subscriber terminal, where the wireline backbone forms a core network.

BACKGROUND OF THE INVENTION

The difficulty in a terrestrial system is the inherent need for internal communication. Cells are generally not connected over the air. Instead, an air interface is defined within a small area around a base station (access radio port or microport). A number of microports are distributed geographically to give a desired region of coverage (e.g. the continental US). The distributed microports are connected by a plurality of access nodes to some core transport network, presumably wired, as opposed to wireless, as shown in FIG. 1. Several microports may be connected to a single access node.

Between access nodes, which are typically connected terrestrially over wirelines, an alternate means of addressing is needed. The demands of multimedia, for which terrestrial wireless systems are now being considered, imply transport by means of a fast packet switched network, e.g. ATM (Asynchronous Transfer Mode). Packet switching affords flexibility in the bandwidth assigned to a connection as well as in the delay incurred in propagating through the network. Message switching and circuit switching would not appear to offer the flexibility and speed necessary to meet the demands of multimedia. This is due, in part, to the longevity of message and circuit switched connections in a wireless environment, in which the users are mobile and move from cell to cell. Datagrams also do not appear to be a solution to the problems because of the additional circuitry and overhead involved in datagram reassembly. Both of the above observations further point to packet switching as a fast and flexible solution.

In current terrestrial CDMA wireless systems, user signals, received by an originating access radio port, are routed to the intended destination radio port using an individual spreading code to encode the signal. The individual spreading code uniquely associates the spread spectrum signal with a particular wireless receiver. This method reduces optimum system performance and data rates. Therefore, there is a need for a low-cost, flexible, high performance system that can distribute user data to the appropriate destination user without adding undue complexity and costs to the infrastructure (radio port) equipment. The present invention, as described herein, provides a low-cost, flexible, high performance means for interfacing a code division switched wireless system to fast packet switched network for backhaul to the core network.

SUMMARY OF THE INVENTION

The present invention comprises a system and devices for solving the current problem by extending code division switching to a terrestrial CDMA wireless system. Code division switching is the means by which subscribers are interconnected in a large scale wireless system, leveraging the fact that multiple users share a common air interface at either end of the wireless connection. Code division switching is based on the ability through code division multiplexing to support multiple users over a common air interface.

The present invention relies upon the application by a source user terminal of an individual spreading code (PN-code) based on a port identifier to a transmission signal (containing no payload data). This forms the preamble. A few bits of data follow, to which the PN-code is also applied to form the packet header. Following the preamble and packet header, a switch is triggered and PN-code sequences are applied by the source user terminal, after applying an individual spreading code based on an identifier for an individual user, to a transmitted spread spectrum signal (containing individual user data). The transmitted spread spectrum signal is received by an originating access radio port (also called the receiving microport because the microport receives information and data from a mobile subscriber) to distribute the spread spectrum signal to the intended destination radio port (also called the transmitting microport because the microport transmits information and data to the mobile subscriber) via a wireline packet switched network such as ATM. The packet switched network is used to distribute information and data to the destination radio port. Switching complexity and equipment volume are, thereby, greatly reduced since all user code processing is performed at the periphery of the network (subscriber/user terminal) and greater data rates and improved system performance can be realized.

The present invention involves a novel change to the previous methods of transporting user data, between access radio ports, on the wireline backbone of terrestrial wireless systems.

It is therefore an objective of the present invention to simplify and reduce switching complexity (hardware and/or software) and equipment volume within the infrastructure of a terrestrial CDMA wireless system satellite to increase system performance and data rates.

Yet another object of the present invention is to provide a method and apparatus for improving radio port routing of spread spectrum user data within a terrestrial CDMA wireless system using a packet switched network backbone.

It is another objective of the present invention to take advantage of CDMA orthogonal coding schemes to perform baseband self-routing (at the originating wireless terminal) in an effort to reduce the volume of radio port switching equipment to the number of interconnected radio ports rather than the number of individual system users.

BRIEF DESCRIPTION OF THE DRAWINGS

The invention is best described with reference to the detailed description and the following figures, where.

DETAILED DESCRIPTION OF THE PREFERRED EMBODIMENTS

Figure 1:
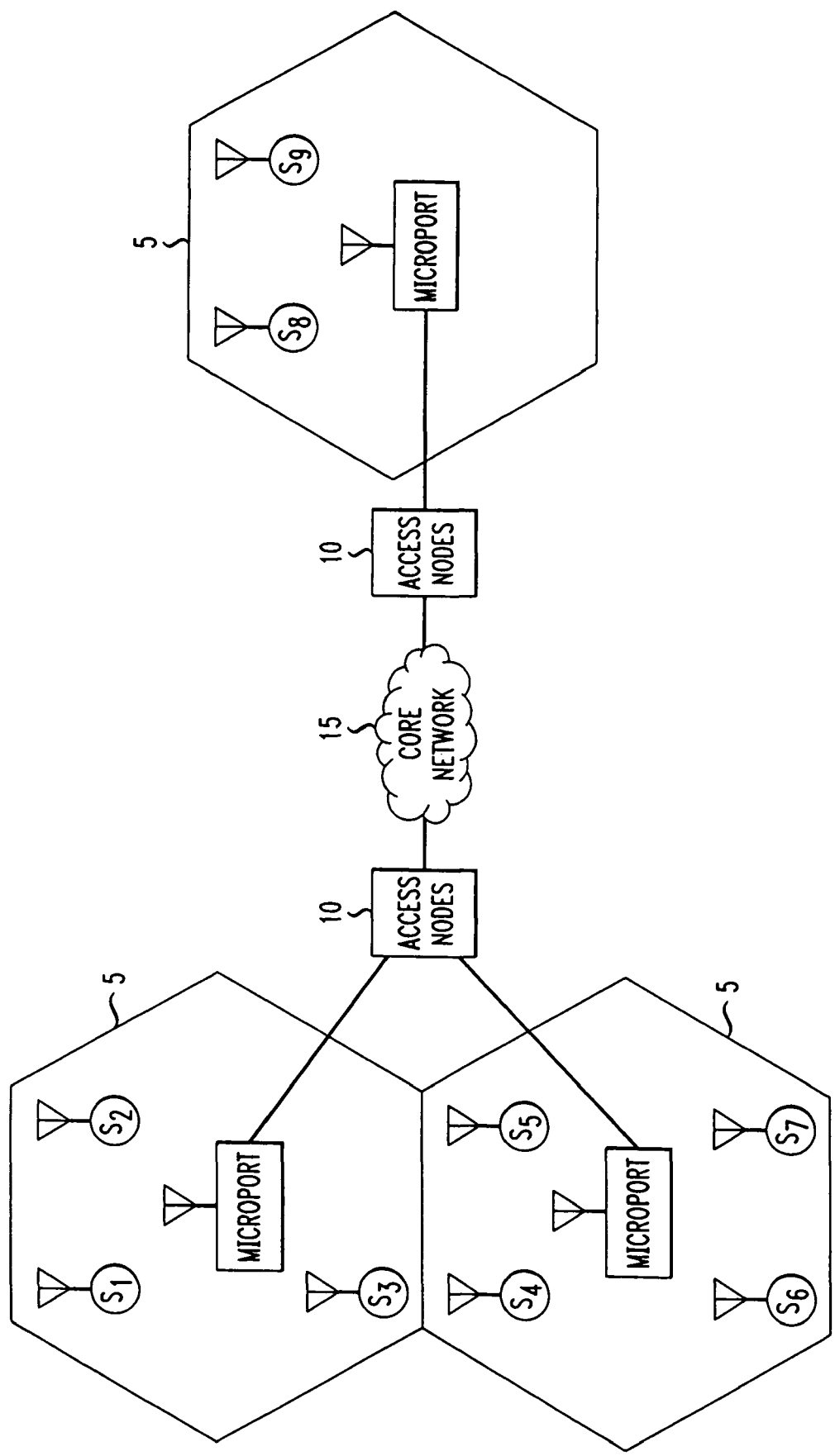
FIG. 1 depicts an exemplary system configuration.

FIG. 1 depicts a terrestrial wireless system configuration. Within a terrestrial CDMA wireless communications system interfacing with a plurality of originating and destination wireless terminal users, a core network backbone 15 interconnects a plurality of access nodes 10 within the system. Originating wireless subscriber/user terminals and destination wireless subscriber/user terminals are interchangeable. That is, on any given transmission, a given wireless subscriber/user terminal may be an originating or a destination terminal. The wireless subscriber/user terminals are depicted within cells 5 by a circle with an antenna. They are distinguished from one another by the letter "s" with a numerical subscript. It should be noted here that the number and identification of subscriber/user terminals within a cell will vary as subscribers drive through a given cell. Also depicted within each cell is an access radio port (also called a microport). An access radio port is depicted as a rectangle with an antenna. The subscriber/user terminals send and receive signals to/from the access radio ports over the air (wireless). The access radio ports are connected via a wireline to an access node. The wireline connections are depicted in FIG. 1 as solid lines. An access node interfaces with a plurality of radio ports communicating with the wireless terminal users. Initial access to the system by a mobile subscriber is asynchronous, that is, the time is unslotted.

It is also possible and appropriate to characterize the air links between a mobile subscriber terminal and its access radio port. A forward link is a link in which the transmission is from the access radio port to the mobile subscriber terminal. A reverse link is a link in which the transmission is from the mobile subscriber terminal to the access radio port. Orthogonal channels are used for both forward and reverse links.

The core network backbone advantageously comprises a fast packet switched network (e.g., Asynchronous Transfer Mode (ATM)). Packet switching provides flexibility in the bandwidth assigned to a wireless connection as well as in the delay incurred in propagating through the network. The present invention provides an efficient means for interfacing the terrestrial CDMA wireless system with the wireline packet switched core network to distribute user data rapidly through the system to an intended destination radio port and user.

Interfacing to a packet switched network is accomplished using the techniques outlined for code division packet switching. In code division packet switching, transmissions intended for the same microport are grouped together by a common PN-code. In a terrestrial system, the intervening transport is likely to be a packet switched network. The transport in a terrestrial system may, however, be by any other means that provides a flexible, high performance system. Transmissions from a mobile subscriber terminal are broadcast over the air to an originating access radio port on a reverse link. The transmission signals are then directed through an access node to and through the packet switched network to another access node, which directs the signal to the destination microport. After reaching the destination cell area, the data are transmitted over the air according to the forward link air interface design.

A preamble is prepended to a packet to be transmitted (before the header). The preamble is at most the length of one data bit but may contain a number of chips. There is a code common to all packets contained within the preamble. The code is recognized by a receiver and is used to acquire and synchronize the signal (packet). The PN-code is called a cover code and is the same for all users that transmit to an access radio port. Once the PN or cover code is acquired then the orthogonal code can be recognized.

Within a given cell all user preamble and header transmissions are presented over the air in the same time and frequency space, separated by a pseudorandom noise code or PN-code. The PN-code effectively spreads a user's preamble and header transmission over a bandwidth greater than that needed to represent the data itself. Users are transmitting asynchronously in this interval. This has the effect of hiding the data from anyone other than the intended recipient. Without the proper code, the spread signal looks like noise and cannot be used by an unintended receiver. The PN-code described is only used as a typical example and any other code performing a similar identifying function may be substituted, and therefore the PN-code is not intended as any hardware/software limitation to the present invention. Contention for the initial access is resolved with a spread-spectrum random access protocol, while the data transmissions utilize orthogonal codes.

Orthogonal codes, identifying each individual originating user, have the further effect of canceling the interference of other transmissions that may be present over the air at the time of decoding. Being orthogonal, they have zero cross correlation. As a result transmitted signals contribute relatively little co-interference in adjacent signal spaces. Orthogonal codes require synchronization between all transmitting users. Each transmitting user has its own uniquely assigned orthogonal code. The number of orthogonal codes is limited and is equal to the spreading factor N. This is an important factor in multiplexing signals, which at some point are to be resolved with reasonably high integrity. Hadamard codes are a class of code sequences that have the additional property of being orthogonal.

According to the present invention, the routing procedure, both wired and wireless, for an end-to-end connection beginning with the transmitting subscriber terminal is described below.

At the transmitting terminal:
spreading a transmission signal by a PN-code assigned to the intended receiver (receiving port) for the duration of the sequence (this constitutes the preamble);
a few bits are inserted identifying the user or the user's orthogonal code (this constitutes the packet header)
spreading the orthogonal spread signal by the PN-code identifying (and associating) the user with the payload data; and
modulating the transmission signal and the twice spread payload data signal and forwarding the modulated twice spread transmission signal to an access radio port.

At each originating microport:
demodulating a transmission signal;
despreading a transmission signal by orthogonal code assignments to recover microport groupings and route them accordingly; and
translating the orthogonal code assignments to a packet address identifying a destination microport augmented to identify a destination access node The transmitting (originating) access node directs the fully addressed packets into the core network. At the destination access node, packets are distributed among the microports according to their respective address fields. At each destination (transmitting) microport, the address fields are translated to orthogonal codes, the data respread and put over the air. Equipped with the correct orthogonal assignment, each receiving terminal can pull its intended transmission out of the air without the need for explicit switching between subscribers.

Figure 2:
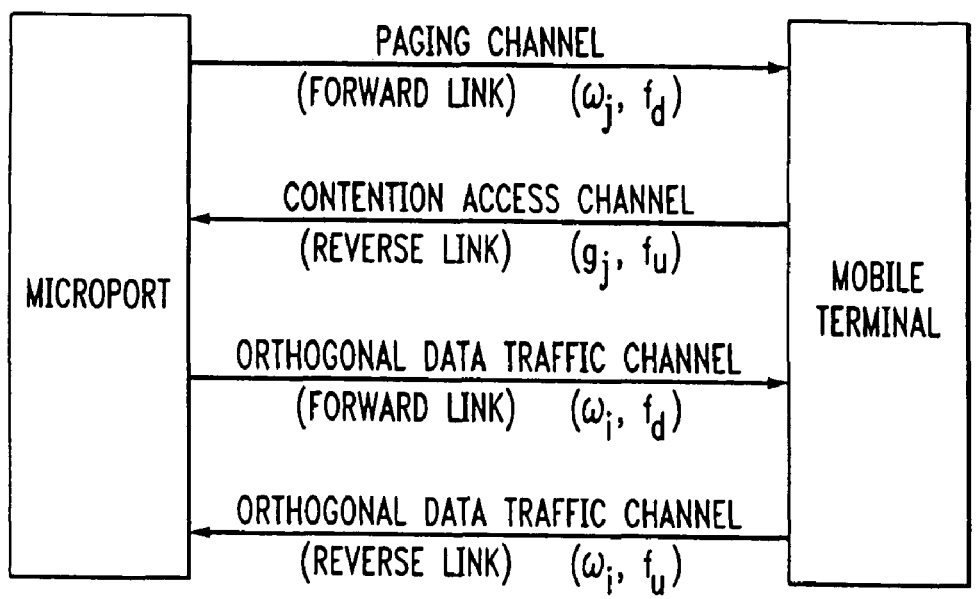
FIG. 2 illustrates the common air interface.

FIG. 2 depicts the common air interface design. Specifically, the system under consideration is frequency division duplexing where the forward link carrier frequency is denoted by $f_d$ and the reverse link carrier frequency is denoted by $f_u$. That is, the frequencies are different for the forward link and the reverse link. The "d" subscript alternatively represents "downlink" and the "u" represents "uplink". The PN-code for identifying the destination port is $g_j$ (in the forward and reverse links) and $\omega_i$ are the orthogonal codes for identifying individual mobile subscribers (i=1, 2, ... N) and $\omega_j$ is the paging channel orthogonal code (forward link)

There is a paging channel between the destination radio access port (microport transmitter) over the forward link that the microport uses to indicate to a mobile subscriber that the microport has information and data for that mobile subscriber. The paging channel is an orthogonal forward link channel for transmitting paging messages or responding to contention access channel requests. There is one paging channel per microport and is identified by orthogonal code $\omega_j$. There is a contention access channel between an originating mobile subscriber and an originating radio access port (microport receiver) over the reverse link by which an originating mobile subscriber communicates with an originating radio access port. Since a number of mobile subscribers are attempting to communicate with a single microport there is contention for the microports attention. Thus, the access channel has contention. That is, the contention access channel is for transmitting access request messages or responding to paging messages. There is one contention access channel per microport and is identified by PN-code $g_j$. Transmissions over the contention access channel are made according to the spread spectrum random access protocol.

Payload data (orthogonal data traffic channel) over the forward link is spread with both the PN-code identifying the port and an orthogonal code uniquely identifying the mobile subscriber. The forward link payload data channel is used for transmitting information and data and is identified by orthogonal code $\omega_i$ (i=1, 2 ..., N and i≠j) uniquely assigned to a mobile subscriber by the microport transmitter after the paging process. Payload data (orthogonal data traffic channel) over the reverse link is spread with both the PN-code identifying the port and an orthogonal code uniquely identifying the mobile subscriber. The reverse link payload data channel is used for transmitting information and data and is identified by orthogonal code $\omega_i$ (i=1, 2 ..., N) uniquely assigned to a mobile subscriber by the microport receiver after the access process.

Figure 3A:
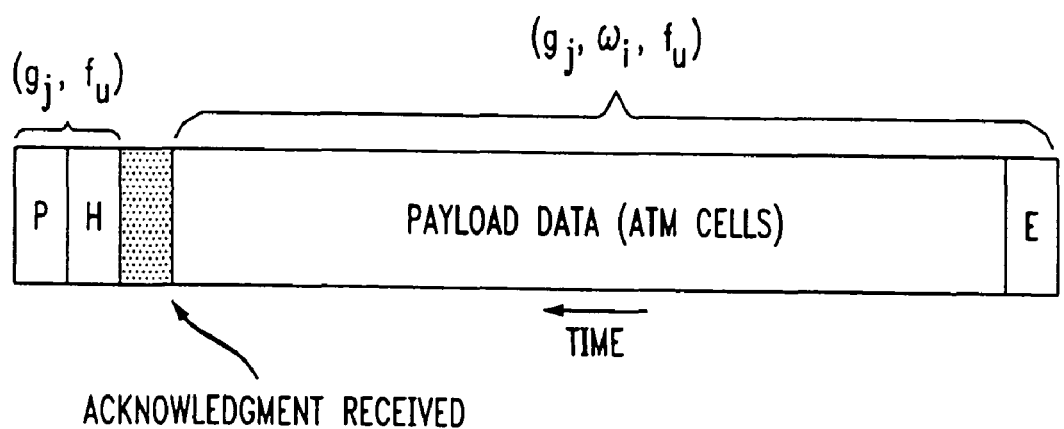
FIG. 3a depicts the packet format of the reverse link.

FIG. 3a depicts the packet format for the reverse link. Initial access by a mobile subscriber terminal to a microport has the dual purpose of sending data to the microport and providing information that aids in the later transmission of data and the synchronization of that data with a standard reference time maintained by the microport. The payload data (transmitted between the originating mobile subscriber and the originating radio access port (microport receiver)) is formatted according to the depicted packet where "P" represents the preamble (no data), "H" represent the header and "E" represent the end of the packet flag. The payload data is spread by both the microport PN-code $g_j$ and the uniquely assigned mobile subscriber orthogonal code $\omega_i$. The preamble and header are spread by the microport PN-code $g_j$ only. The payload data comprises one or more packets or ATM cells. The ATM cells are packets that include ATM headers, which further include destination and source addresses. The preamble and the header are transmitted during the contention period. During this period all transmission signals from all contending users are spread by the same microport based PN-code $g_j$. The spread spectrum random access (SSRA) protocol utilizes the delay capture property of the spread spectrum signal. The contention free period comprises the transmission period for the payload data and the end of packet indicator (flag). During this period all transmitting users are assigned an orthogonal code uniquely identifying the transmitting user.

Figure 3B:
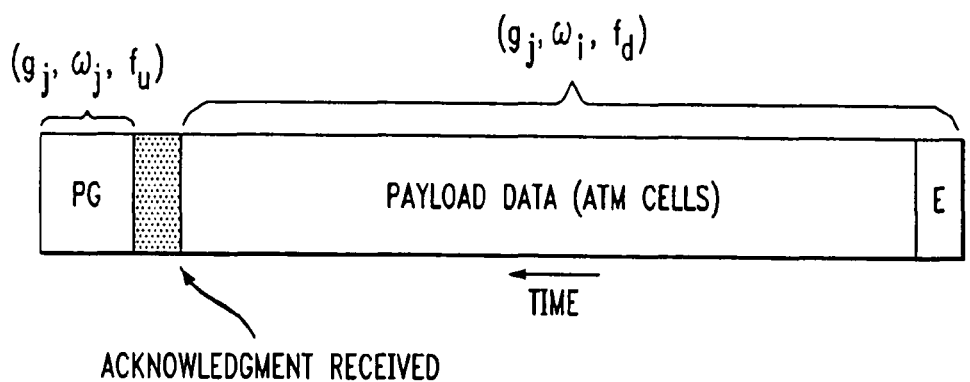
FIG. 3b depicts the packet format of the forward link.

FIG. 3b depicts the packet format for the forward link. That is, the payload data is formatted according to the depicted packet between the destination radio access port (microport transmitter) and the destination mobile subscriber where "PG" represents paging information and "E" represents the end of packet flag. The payload data is spread by both the microport PN-code $g_j$ and the uniquely assigned mobile subscriber orthogonal code $\omega_i$. The paging information is spread by the paging channel orthogonal code $\omega_j$ only.

Figure 4A:
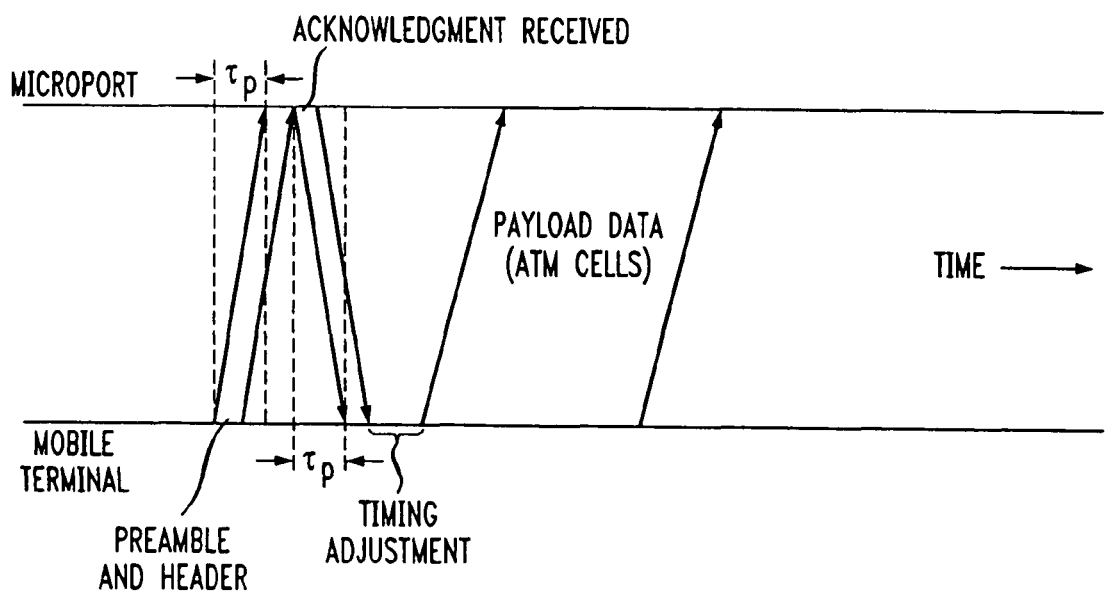
FIG. 4a is the reverse link access and transmission flow in time.

FIG. 4a depicts the preamble, the packet header, the acknowledgement and the payload data as they flow between the originating mobile subscriber terminal and the microport receiver in time. The preamble and the header access are utilized by the spread spectrum random access (SSRA) protocol. Also the preamble and header are transmitted asynchronously but "marking" their transmission time for obtaining synchronization of the orthogonal codes in the next step of the process.

Simultaneous transmission of preambles and headers from a plurality of contending mobile users may be received successfully by the receiving microport if they arrive at the microport despreader greater than one chip (bit interval of the PN-code) apart. This is due to the delay capture property of spread spectrum signals. The acknowledgement message contains the time adjustment required for the orthogonal transmission that follows. The acknowledgment message also contains the assignment of the orthogonal code to the transmitting mobile user. This assignment is made by the microport from the available (not utilized) orthogonal codes. This is due to the limited number of orthogonal codes available. If there is no available orthogonal code, then the transmission is blocked. Upon receipt of the acknowledgment message by the terminal, the terminal adjusts its transmission time with respect to its "marked" position in time. Note a propagation delay of $\tau_p$. The subscriber terminal then switches to position 2 (see FIG. 7b) and utilizes the assigned orthogonal code $\omega_i$ for the payload data transmission. If no acknowledgment message is received by a predetermined time-out period, then the terminal retransmits the preamble and header. The microport receives the payload data synchronously with respect to other terminal transmissions. That is, all payload data arrives synchronously with respect to a reference time. The payload data are despread from the PN and orthogonal codes. The end of packet is indicated by a flag. After the end of packet indicator is received the orthogonal code $\omega_i$ assigned to the subscriber terminal becomes available for reuse and can be assigned to another transmitting (originating) mobile subscriber terminal. The received payload data (e.g., ATM cells) contain their own routing headers and thus can be routed via routers over the core network to a destination as known in the art and in accordance with communications standards.

Figure 4B:
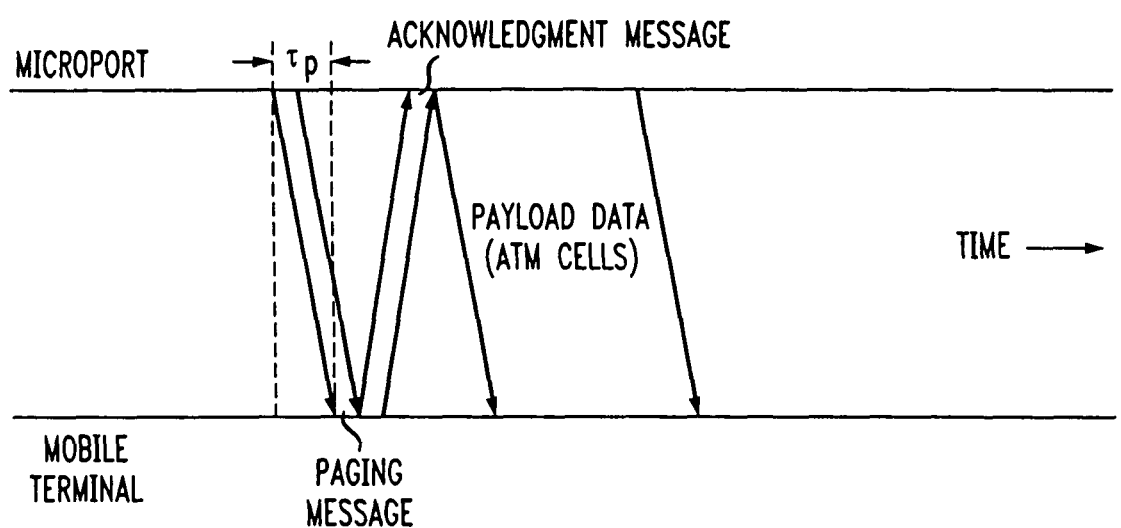
FIG. 4b is the forward link paging and transmission flow in time.

FIG. 4b depicts the paging message, the acknowledgment and the payload data as the flow between the destination radio access port (microport transmitter) and the destination mobile subscriber terminal. The paging message indicates to the destination mobile subscriber terminal that the transmitting microport (microport transmitter) has information and data for it. Note both that there is a propagation delay of $\tau_p$ and also that there is no time adjustment necessary on the forward link. The destination mobile subscriber terminal sends an acknowledgement message to the transmitting microport. Upon receipt of the acknowledgement message from the destination mobile subscriber terminal, the transmitting microport forwards the payload data.

Figure 5A:
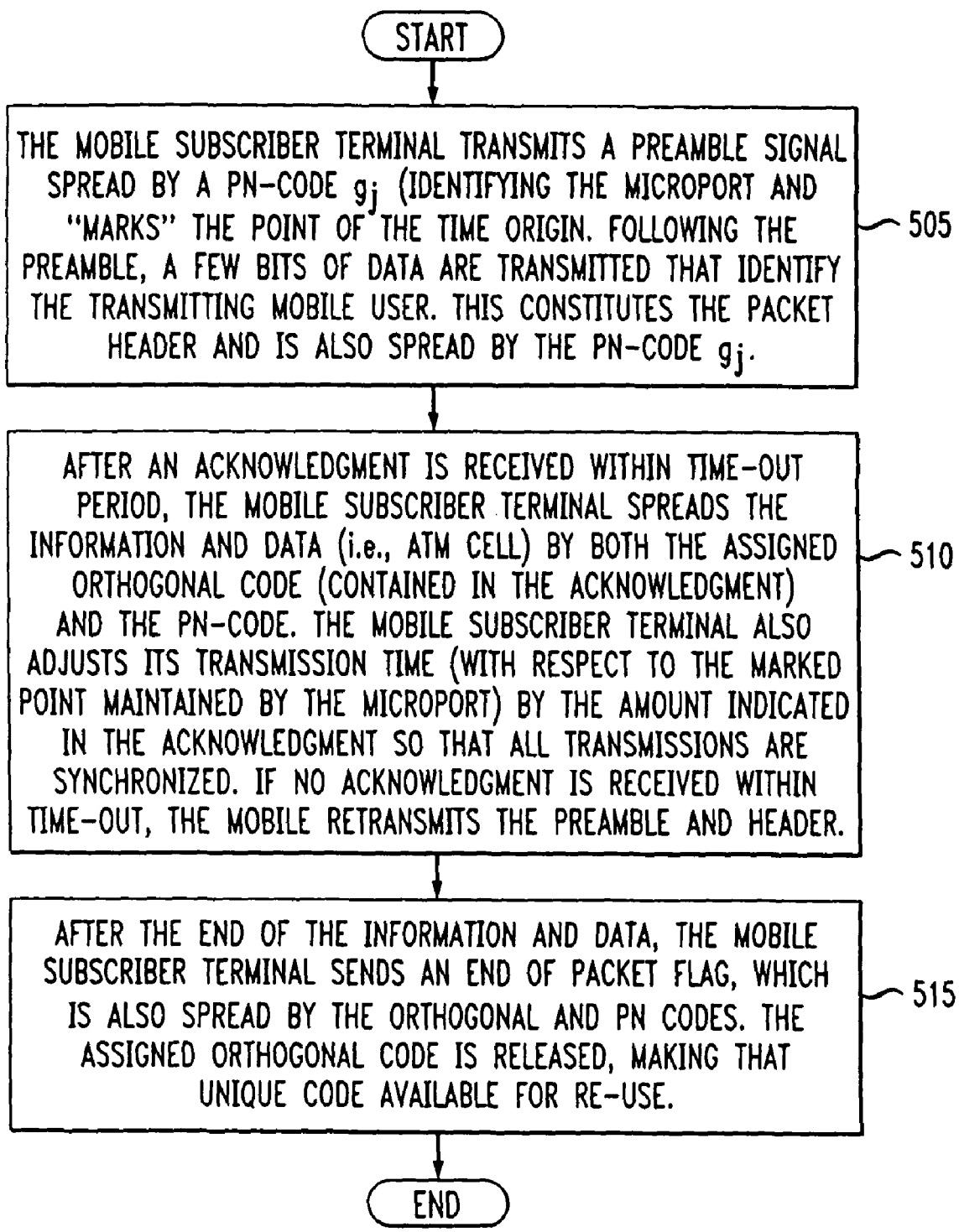
FIG. 5a is the flow of the actions of the originating mobile subscriber.
Figure 5B:
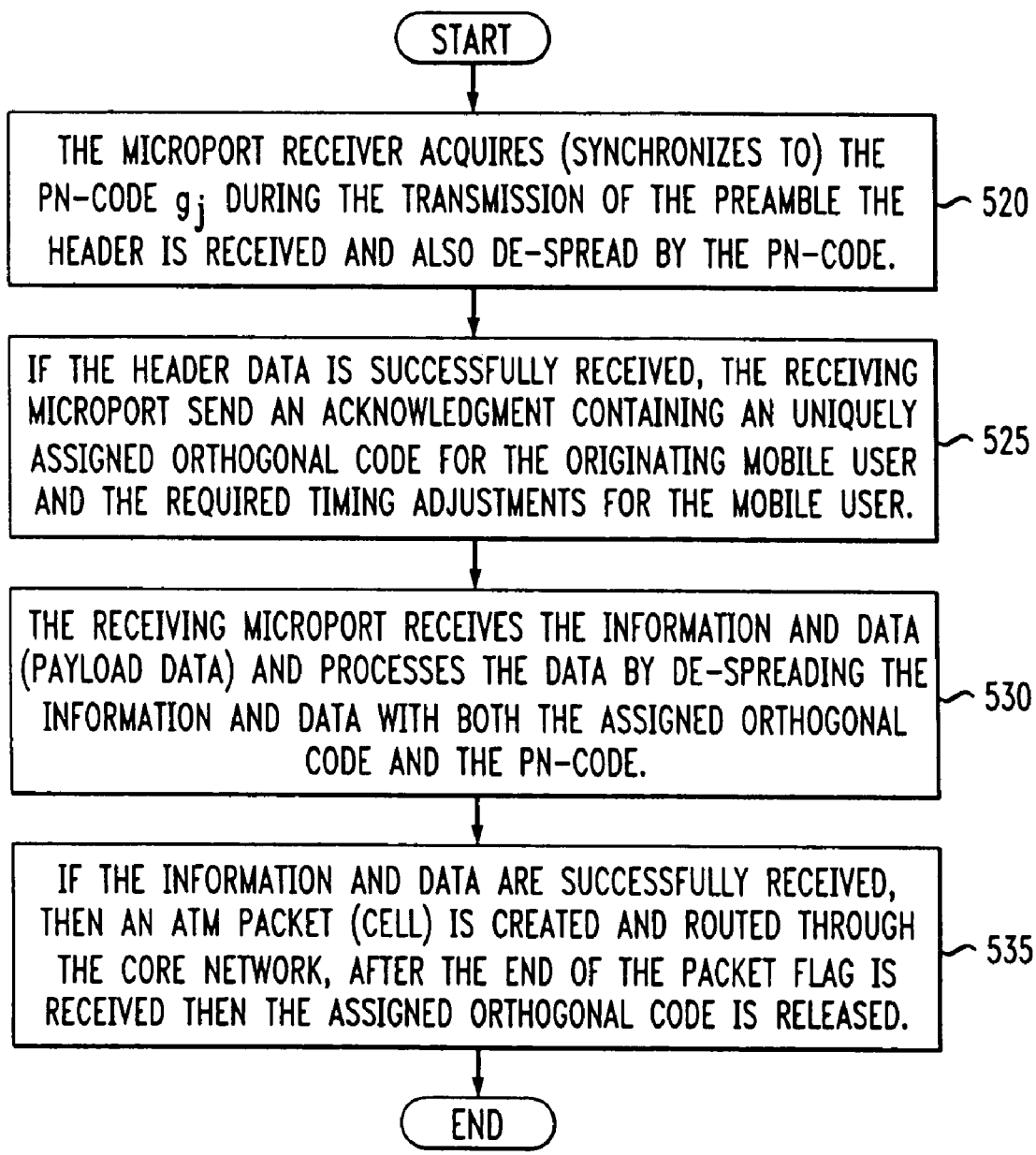
FIG. 5b is the flow of the actions of the originating radio access port (receiving microport).

FIGS. 5a and 5b depict the reverse link (mobile-to-microport) access operation, which is based on the spread spectrum random access (SSRA) protocol. That is, the preamble and header (P&H, see FIG. 3a) of the transmitting (originating) mobile subscriber (user) is spread by the PN code, $g_j$, of microport j. Transmissions that arrive one or more chips, where a chip is the bit length of the PN-code, apart can be distinguished and received successfully (this phenomenon is called delay capture).

FIG. 5a is a flowchart of the actions performed at the originating (transmitting) mobile subscriber terminal. Step 505 is performed with the switch (shown in FIG. 7b) in position 1, which allows the preamble and header information to flow through the switch but no payload data. Step 510 represents the spreading of the payload data twice when the switch depicted in FIG. 7b is in position 2. Step 515 represents the completion of the sending of the payload data and the end of packet flag so that the uniquely assigned orthogonal code can be released.

FIG. 5b is a flowchart of the steps performed at the originating radio access port (microport receiver). At step 520, the receiving microport acquires the preamble, which has the PN-code without any payload data. The preamble is acquired using a serial/parallel acquisition circuit, which synchronizes to the PN-code. The header is also received and despread at step 520. The PN-code is asynchronous and received unslotted. The acquisition process is the initial synchronization. At step 525, once the preamble is acquired and processed, the receiving microport sends an acknowledgment, which contains a uniquely assigned orthogonal code for the originating mobile user and the required adjustments for the orthogonal transmission that follows. The timing adjustments are derived by comparing the arrival time of the preamble to the reference time, which is maintained by the receiving microport. The purpose of making timing adjustments is to synchronize all orthogonal code transmissions to a standard reference time maintained by the microport. A short time later (a matter of a few msecs), the receiving microport receives the payload data, which are processed by despreading by the orthogonal and PN-codes as indicated at step 530. If the information and data are successfully received by the receiving microport then an ATM cell (packet) is created and the packet is routed through the core network in accordance with standards and protocols for core network use. After the end of packet flag (step 535) is received by the receiving microport the assigned orthogonal code becomes available for reuse and re-assignment.

Figure 5C:
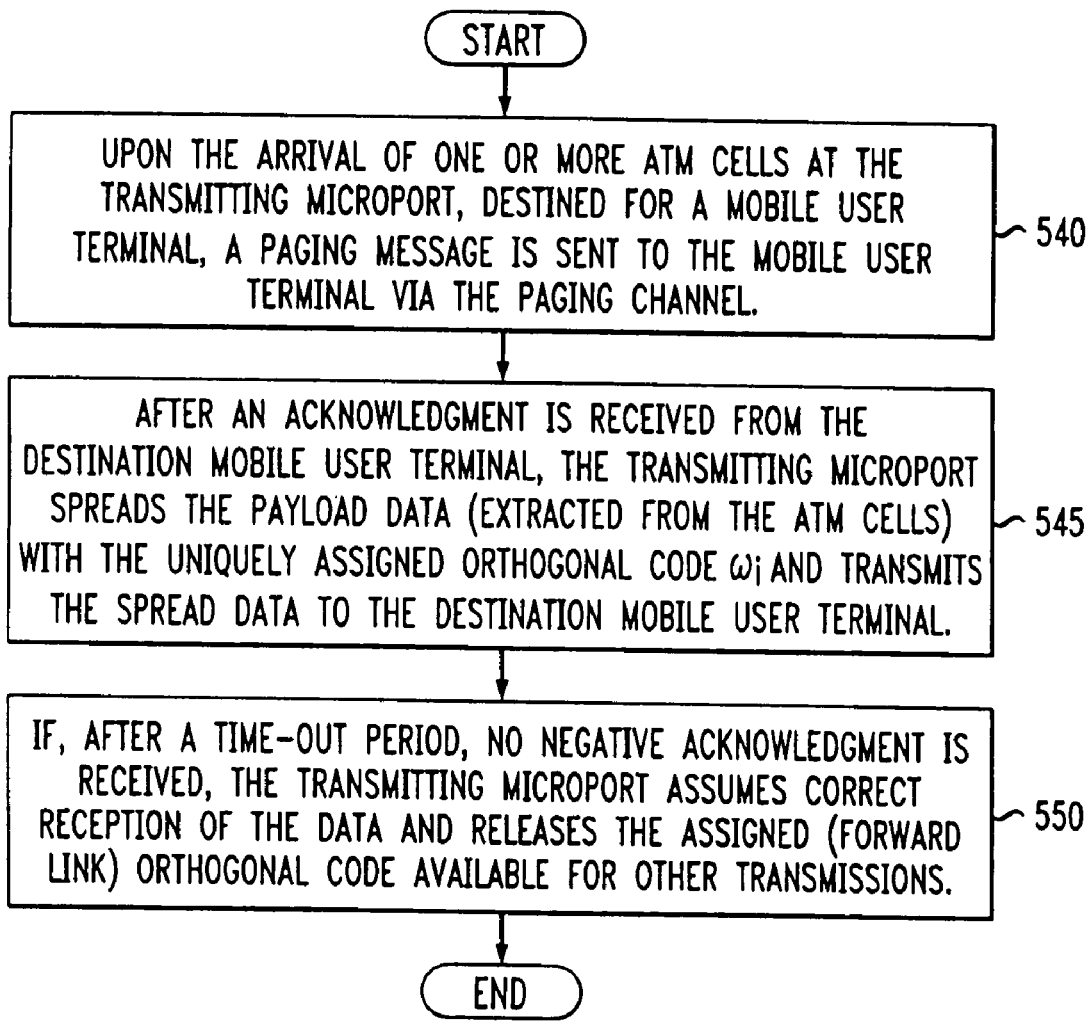
FIG. 5c is the flow of the actions of the destination radio access port (transmitting microport).
Figure 5D:
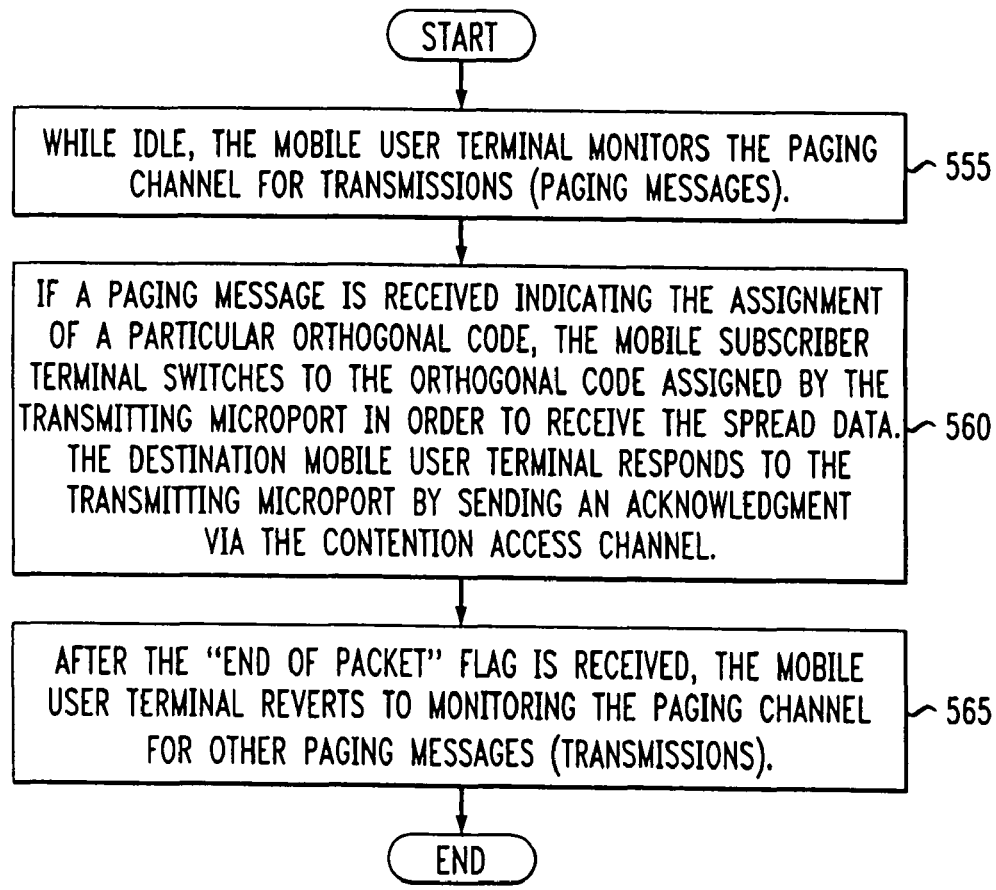
FIG. 5d is the flow of the actions of the destination mobile subscriber.

FIGS. 5c and 5d depict the forward link operation (microport to mobile user). FIG. 5c depicts the actions at the destination microport (transmitting microport). Upon the arrival at the destination microport of one or more ATM cells destined for a mobile user, a paging message is sent to the mobile user via the paging channel (step 540). The paging message includes an assigned forward link orthogonal code $w_i$. The mobile user terminal responds with an acknowledgment. After the transmitting microport receives the acknowledgement from the destination mobile user terminal via the contention access channel, the transmitting microport spreads the payload data (extracted from the ATM cell) with orthogonal code $\omega_i$ and transmits it to the mobile user terminal (step 545). The data includes the end of packet flag. If, after a time out period, no negative acknowledgement is received, the transmitting microport assumes that the mobile subscriber terminal correctly received the data and releases the assigned (forward link) orthogonal code making it available for reuse and reassignment for other transmissions (step 550).

FIG. 5d depicts the actions of the destination mobile user terminal via the forward link. While idle, the mobile subscriber terminal monitors the paging channel for transmissions (step 555). If a paging message is received indicating the assignment of a particular orthogonal code, the mobile user terminal switches to that orthogonal code in order to receive the data. The switch to the orthogonal code specified by the microport is indicated in the acknowledgment sent to the transmitting microport. The acknowledgment is sent via the contention access channel (step 560). After the end of packet flag is received and decoded (it was spread along with the data), the mobile user terminal reverts to monitoring the paging channel for further paging messages (step 565).

Figure 6:
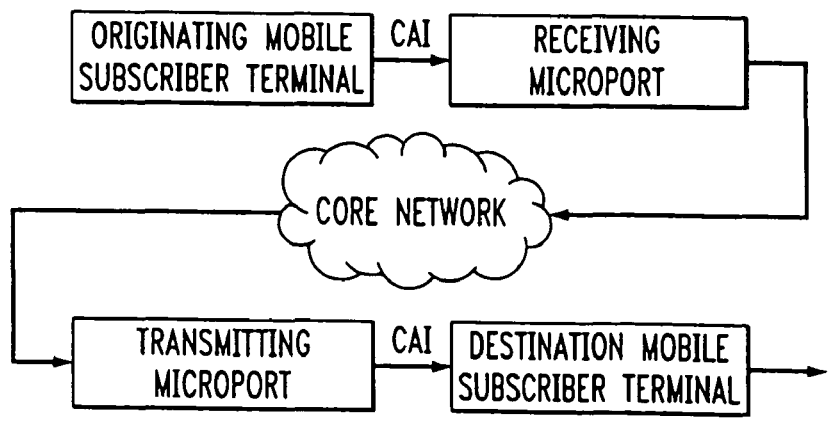
FIG. 6 is a block diagram of the overall flow from an originating mobile subscriber and a destination subscriber.

FIG. 6 is a block diagram of the overall flow from an originating mobile subscriber and a destination subscriber. Similar to the system configuration as depicted in FIG. 1, the solid lines between the receiving microport and the transmitting microport through the core network are wires. The interface between the originating mobile subscriber terminal and the receiving microport is an common air interface (CAI), as is the interface between the transmitting microport and the destination mobile subscriber terminal. The originating and destination mobile subscriber terminal are represented on FIG. 1 as $s_i$. The originating mobile subscriber forwards the signal to the receiving microport, which demodulates, despreads and decodes the signal, creates a packet and forwards the packet to the access node. Following this stage, the packet is directed by the access node into the packet switched network, where it is transmitted to the intended destination radio port, via a routing node for that destination radio port (transmitting microport), based on the packet address. After the (ATM) packet is received by the destination radio port then it is spread by an orthogonal code $\omega_i$ assigned to the receiving user i, and by the PN-code $g_j$, of the destination port j. The signal is then forwarded to the destination mobile subscriber terminal which demodulates, despreads and decodes the signal and presents the information and data to the mobile subscriber for his/her use.

Figure 7A:
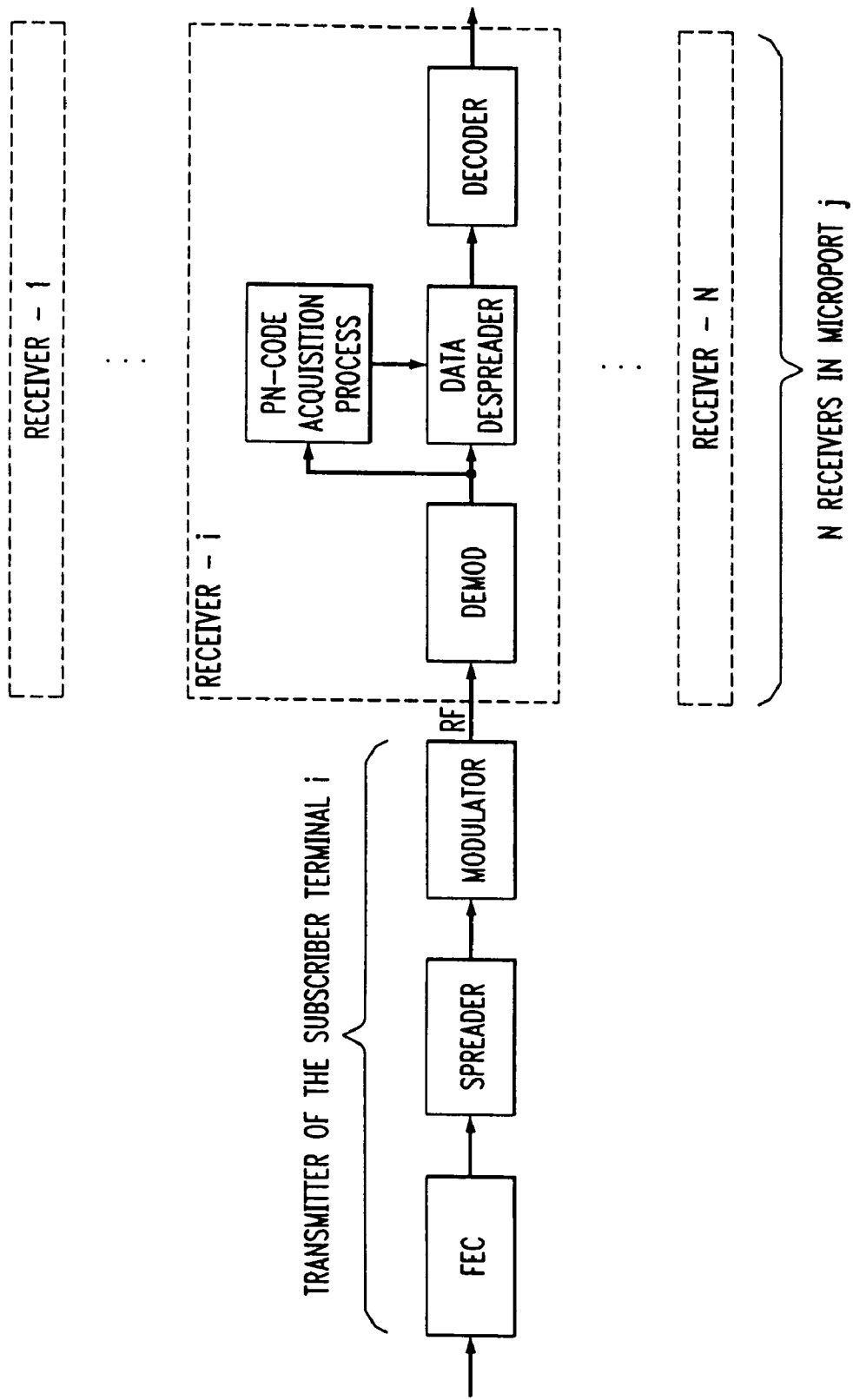
FIG. 7a depicts the reverse link transmission and reception process.
Figure 7B:
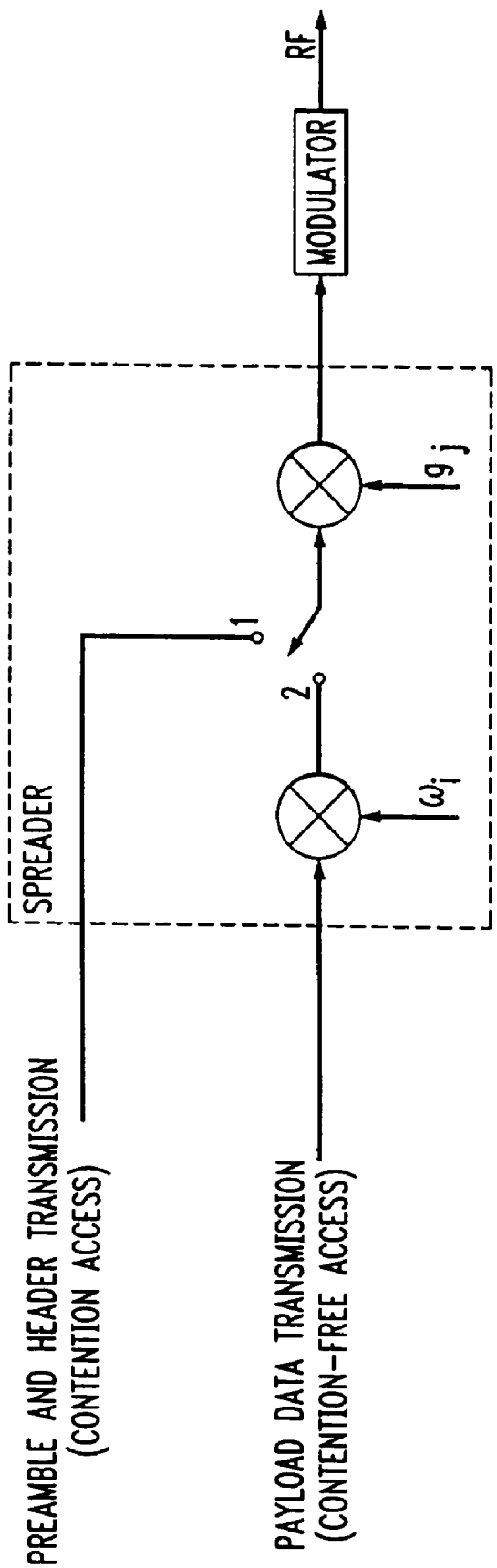
FIG. 7b depicts the spreading process of the originating mobile subscriber.

FIGS. 7a through 7f all depict various aspects and details of the reverse link process. FIG. 7a depicts the reverse link transmission and reception process showing the originating mobile subscriber terminal and the receiving microport. The originating mobile subscriber terminal uses forward error correction (FEC) to detect and correct certain errors. The signal is then spread using a PN-code to spread the preamble and header and both a uniquely assigned orthogonal code and the PN-code to spread the data and the end of packet flag. The signal is then modulated for transmission over the radio frequency (RF) to the receiving microport. The receiving microport is actually a plurality of receivers in parallel. The signal is recognized by at least one of the plurality of receivers and the preamble is synchronized by a PN-code acquisition process. The payload data and the end of packet flag are then despread by a data despreader. The data is then decoded and a cell (packet) is created for transmission over the core network (via the access node) in accordance with standards and protocols for the underlying core network.

FIG. 7b depicts the spreading process of the originating mobile subscriber. The inventive process begins with the originating wireless terminal user within the terrestrial CDMA wireless system (see FIG. 7b). The originating terminal spreads a transmission signal (preamble only) by a PN-code ($g_j$) assigned to the intended receiver microport j for identifying the receiving microport for the duration of the PN sequence, which may be for example, length L=1024. This constitutes the preamble. Following the preamble a few bits of data are inserted uniquely identifying the user or the user's orthogonal code. This constitutes the packet header. Both of these steps are performed with the switch in position 1. That is, the switch allows the preamble and header to flow through the switch but no payload data. Once this is accomplished the switch is moved to position 2. That is, payload data now flows through the switch. The payload data is spread by $\omega_i$, which is the orthogonal code that is assigned to user i by the microport. After being spread by $\omega_i$, the payload data is spread by the PN-code $g_j$ used for identifying receiving microport to which the transmission is directed. This second spreading separates the receiving microport for the present data (signal) from other radio port groups. Conventional spread spectrum radio processing techniques follow this stage as the spread spectrum signal containing the PN-code and unique orthogonal code sequence is transmitted to the receiving microport. The conversion of the twice spread transmission signal to a carrier frequency $f_u$ is performed by the modulator shown on FIG. 7b.

Figure 7C:
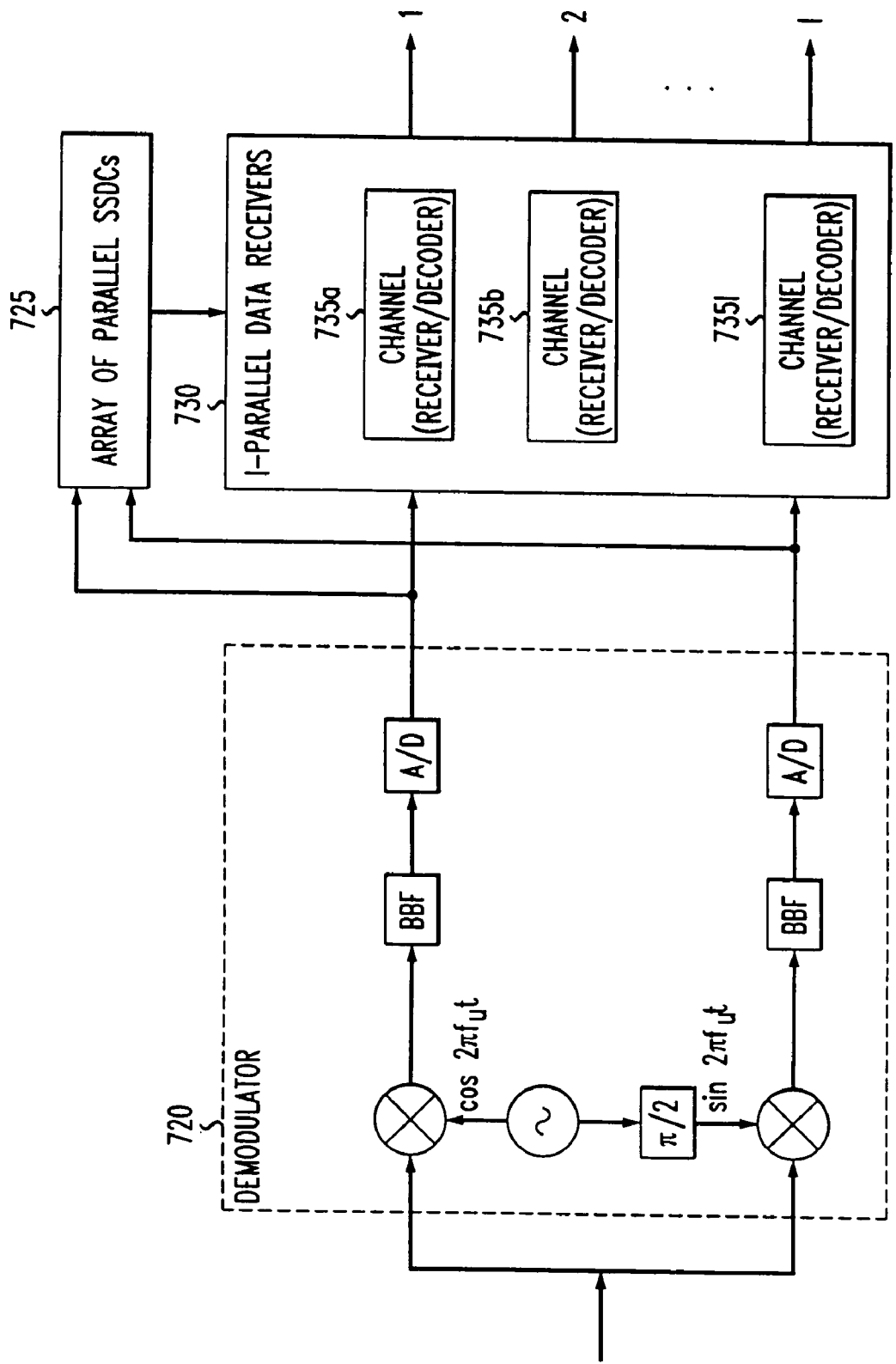
FIG. 7c is a block diagram of the originating radio access port (receiving microport).

FIG. 7c is a block diagram of the originating radio access port (receiving microport). FIG. 7c is a more detailed view of the circuit at the receiving microport. Demodulator 720, which is a device well known in the art, further comprises a pair of multipliers, a pair of baseband filters (BBF) and a pair of A/D converters. The array of serial search detection circuits is denoted as 725 and the array of l-parallel Data Receivers 730 comprises l channel decoders (735-*a*, . . . 735-*l*). The array of SSDCs 725 constitutes the acquisition process used to synchronize the preamble and header. The l-parallel data receivers 530 constitute data reception and comprise the data despreader and the decoder.

Figure 7D:
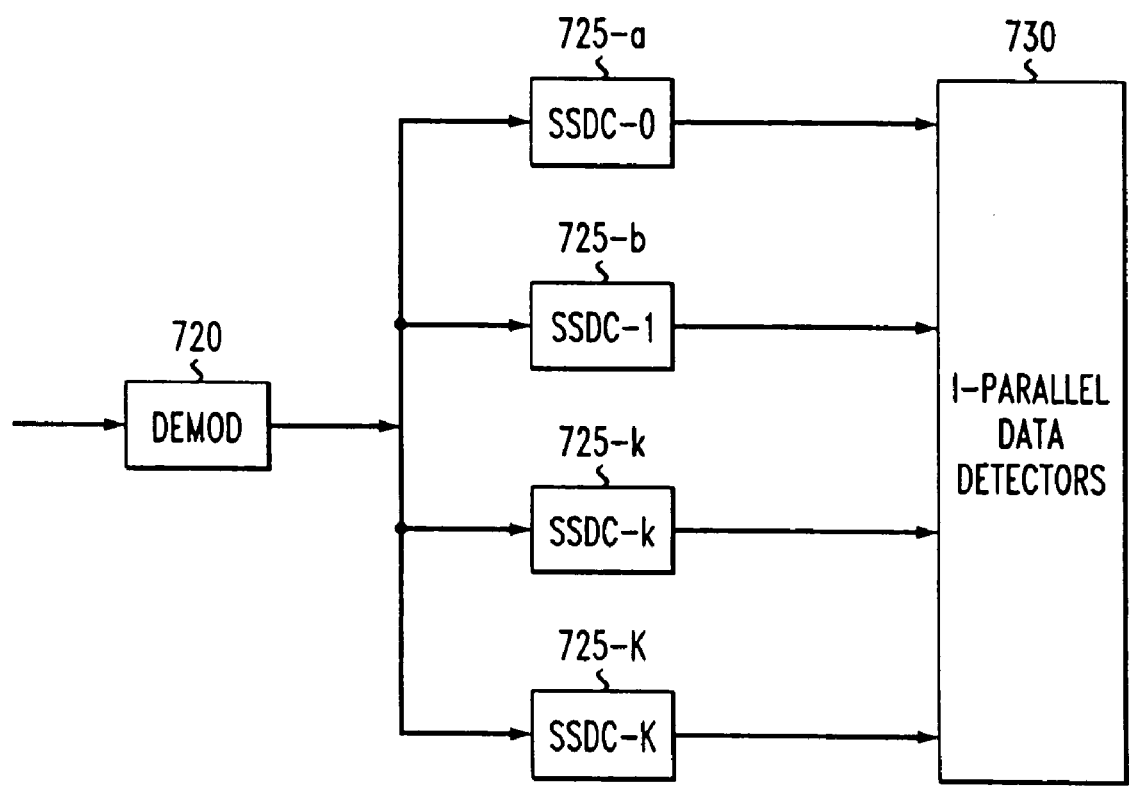
FIG. 7d depicts the serial/parallel PN-code acquisition process.

FIG. 7d depicts the serial/parallel PN-code acquisition process. FIG. 7d depicts the serial/parallel acquisition circuit at the destination microport. The serial/parallel acquisition unit comprises a demodulator 720, an array of serial search detection circuits (725-*a*, . . . 725-K) in parallel and an array of l-parallel data receivers 730, which further comprises l channel decoders. Each SSDC searches in a window of L/K chips, where L is the length of the PN-code and K is the number of SSDCs. The SSDC-k searches in the window [(k−1), kL/K]. The plurality of SSDCs constitutes an acquisition circuit.

Figure 7E:
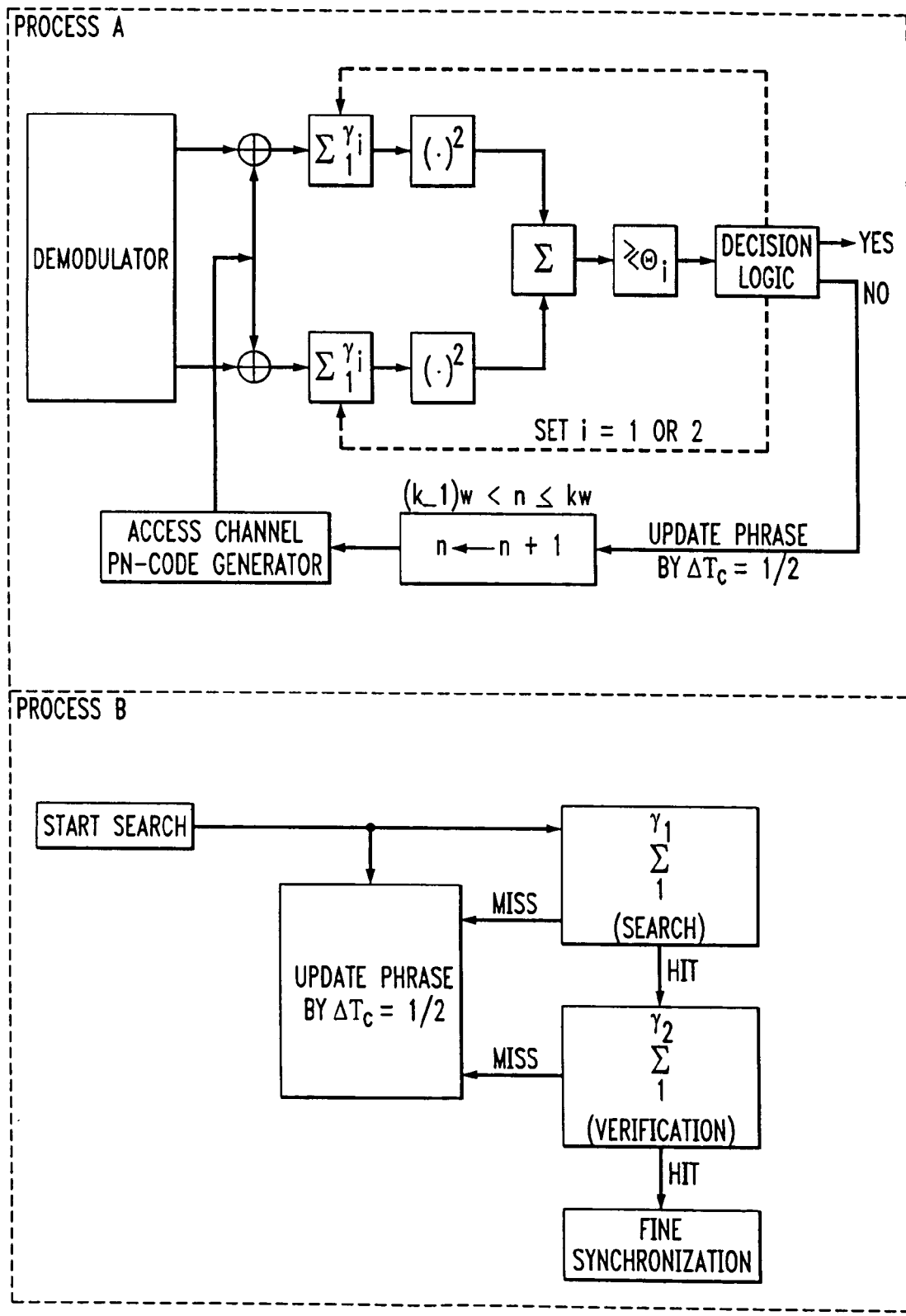
FIG. 7e depicts a typical double-dwell SSDC for PN-code acquisition.

FIG. 7e depicts a typical double-dwell SSDC for PN-code acquisition. Process B follows process A. Process A is essentially an acquisition circuit. The timing adjustment determination portion has been left out for clarity and simplicity. Process A is performed within a variable window, which could be one chip long to the entire length of the PN-code sequence depending on the value of K (K=1, . . . L). Windows one chip (K=L) in length are very fast. However, many windows are then required increasing circuit complexity. Windows the entire length of the PN-code sequence (K=1) are significantly slower but significantly less complex. The step n=n+1 accomplishes a shift by one chip. Once PN-code synchronization is achieved, the PNcode timing offset from the reference time (maintained by the receiving microport) is determined and inserted into the acknowledgement message and forwarded to the originating mobile subscriber terminal along with the uniquely assigned orthogonal code. Process B in FIG. 7e depicts a double dwell algorithm.

Figure 7F:
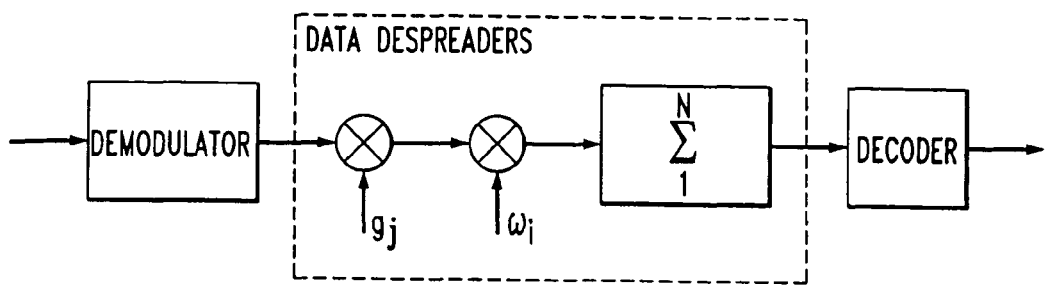
FIG. 7f depicts the despreading process at the originating radio access port (microport receiver) during payload data transmission over the reverse link during the contention free period.

FIG. 7f depicts the demodulation and despreading process at the originating radio access port (microport receiver) during payload data transmission over the reverse link during the contention free period. The despreader is a data despreader. The signal is demodulated. Following demodulation of the signal, the preamble and header are despread. Once the preamble and the header are received and despread, then the payload data are despread using both the uniquely assigned orthogonal code and the PN-code. The summation is performed over N, which is the length of the orthogonal code. The accumulator sums from 1 to N, where N is the total number of orthogonal codes and the length or size of the orthogonal Hadamard code. N is both the total number and the length of the orthogonal codes because the number of chips is the same. After the signal is despread, then the data is decoded by the decoder.

Figure 8A:
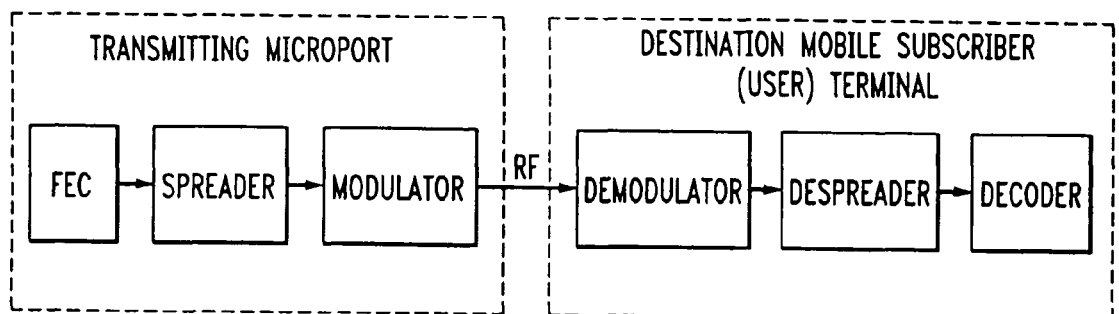
FIG. 8a depicts the forward link reception and transmission process.

FIG. 8a depicts the forward link reception and transmission process. The transmitting microport receives the data (packaged in an ATM cell) and performs forward error correction on the data. The transmitting microport then spreads the data as further illustrated in FIG. 8b. The spread data are then modulated for transmission over a radio frequency (RF) to the destination mobile subscriber terminal. The destination mobile subscriber terminal receives the signal and demodulates it. The data are then despread (preamble, header and payload data) and finally decoded for presentation to the subscriber using the mobile user terminal.

Figure 8B:
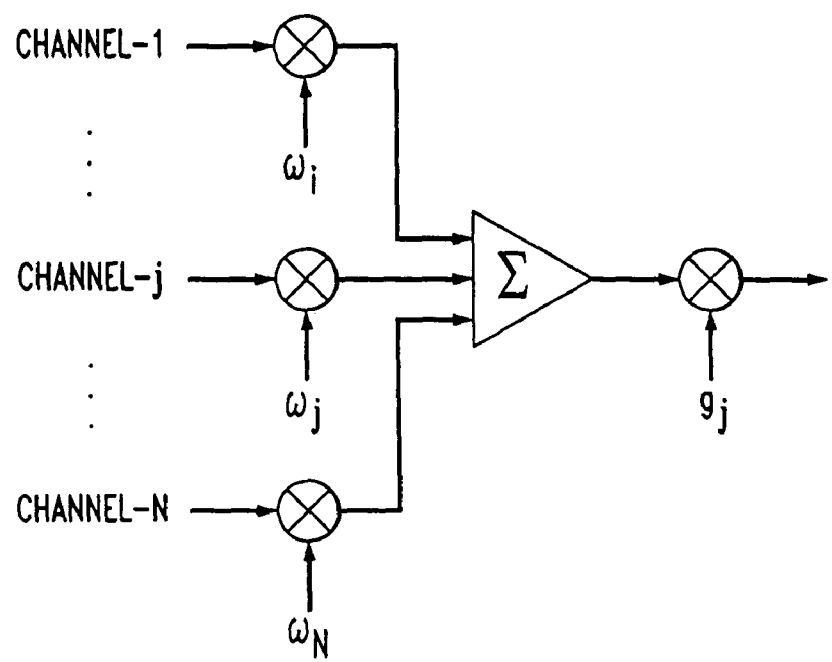
FIG. 8b illustrates the spreading operation at the destination radio access port (microport transmitter) for the forward link.

FIG. 8b illustrates the spreading operation at the destination radio access port (microport transmitter) for the forward link. FIG. 8b is an exploded view of the spreader at the transmitting microport. FIG. 8b is a block diagram of the transmitting microport and a destination subscriber terminal and the radio frequency (RF). The microport performs forward error correction and then spreads the signal. This is followed by modulation and transmission over the air (RF) interface to the destination subscriber terminal. The receiving subscriber terminal demodulates the signal and then despreads and decodes the signal. The destination user terminal can extract the transmitted user signal by filtering out other signals that do not contain the unique orthogonal code applied by the originating user. A subscriber terminal i, while idle monitors a broadcast/paging channel j spread by orthogonal code $\omega_j$. The broadcast/paging is effective only for those subscriber terminals in the coverage area. When a broadcast/paging message is received for subscriber terminal i indicating that an assigned code i, the subscriber terminal uses code $\omega_i$ to receive its data. In the spreader the PN-code $g_j$ is used to distinguish one microport from another microport and reject interference between adjacent microport. The accumulator sums over i=1 to N, where N is the length of the orthogonal code. No synchronization is required because the signals are transmitted from the same microport. The orthogonal codes $\omega_i$, where i=1, . . . , N and i≠j are user channels and j is the paging channel.

Figure 8C:
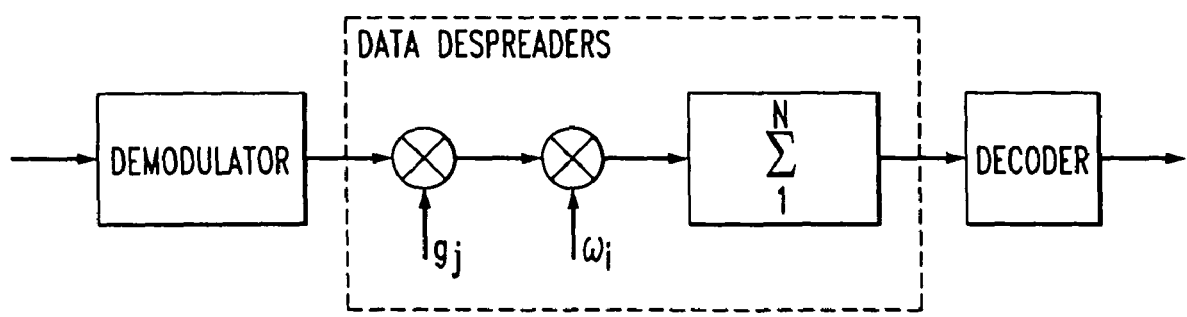
FIG. 8c depicts the demodulation and despreading process at the destination mobile subscriber over the forward link.

FIG. 8c depicts the demodulation and despreading process at the destination mobile subscriber over the forward link. This process is virtually identical to the demodulation and dispreading process for the reverse link as depicted in FIG. 7f.

A procedure and system have been described for using code division packet switching techniques to simplify the network processing involved in interfacing with a packet switched network in a terrestrial wireless system. Individual subscriber switching is accomplished through the unique assignment of orthogonal codes to the subscriber terminals. PN-codes are assigned, in addition, to group transmissions intended for the same receiving microport.

While the present invention is described using a wireless CDMA terrestrial communications network embodiment, it is not deemed a departure from the spirit and scope of the present invention to apply the fundamental novel concepts to a similarly configured wireless communications network.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method executed in an access radio port of a terrestrial wireless network that is coupled to a packet network, comprising the steps of:
   receiving one or more packets having a destination address that corresponds to a particular mobile terminal;
   assigning an orthogonal code, $g_i$, that corresponds to said destination address;
   creating an outgoing message comprising payload information of said one or more packets, and terminated with an end-of-message flag;
   twice spreading the outgoing message with said $g_i$ orthogonal code and an orthogonal code, $\omega_i$, that is assigned to said access radio port;
   transmitting the twice spread message over the wireless terrestrial network; and
   releasing the uniquely assigned orthogonal code following transmission of the spread end-of-message flag when a negative acknowledgement fails to arrive within a preselected time interval.

2. The method of claim 1, further comprising the step of transmitting a data indication signal to one of a plurality of mobile subscriber terminals over a channel different from a channel for transmitting the twice spread message each time prior to said step of transmitting, which data indication channel is spread with a paging spreading code, $\omega_j$, of said access radio port.

3. The method of claim 2, wherein the data indication signal identifies said $g_i$ orthogonal code.

4. The method of claim 1, further comprising the steps of:
   receiving a twice spread payload data signal that comprises fast packet-switched network packets from one of a plurality of mobile subscriber terminals; and
   despreading the received payload data signal employing said $g_i$ orthogonal code and said $\omega_i$ orthogonal code.

5. A method executed in a mobile subscriber terminal comprising the steps of:
   wirelessly receiving from an access radio port an assignment of a unique orthogonal code;
   responsive to a subscriber signal comprising fast packet-switching network packets, forming a message including in its payload said packets followed by an end-of-message signal;
   spreading the message by the unique orthogonal code and by a PN code assigned to said access radio port;
   modulating and transmitting the spread message to the access radio port; and
   releasing the assignment of the unique orthogonal code after the spread end-of-message signal is detected.

6. The method of claim 5, wherein the data indication signal includes a preamble and a header that are spread using said PN-code.

* * * * *